United States Patent
Richmond

[11] 3,917,714
[45] Nov. 4, 1975

[54] BIS(ALKYLSULFONYL)VINYLBENZENES

[75] Inventor: Henry Richmond, Whitehouse Station, N.J.

[73] Assignee: American Cyanamid Company, Stamford, Conn.

[22] Filed: Feb. 4, 1974

[21] Appl. No.: 439,194

Related U.S. Application Data

[62] Division of Ser. No. 286,635, Sept. 6, 1972, Pat. No. 3,809,674.

[52] U.S. Cl............................................. 260/607 A
[51] Int. Cl.².................................... C07C 147/08
[58] Field of Search.................. 260/607 A, 45.95 C

[56] References Cited
UNITED STATES PATENTS
3,335,188  8/1967  Oftedahl................................. 260/6
3,809,674  5/1974  Richmond..................... 260/45.95 C Primary Examiner—Lewis Gotts
Assistant Examiner—D. R. Phillips
Attorney, Agent, or Firm—Philip Mintz

[57] ABSTRACT

Bis(alkylsulfonyl)vinylbenzenes of the formula

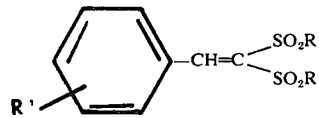

wherein R is alkyl of 1 to 12 carbon atoms or cycloalkyl of 5 or 6 carbon atoms and R' is lower alkyl, lower alkoxy, or hydrogen are useful as ultraviolet light absorbers or light stabilizers for polymers.

1 Claim, No Drawings

BIS(ALKYLSULFONYL)VINYLBENZENES

This is a division of application Ser. No. 286,635, filed Sept. 6, 1972, now U.S. Pat. No. 3,809,674.

This invention relates to the use of bis(alkylsulfonyl)-vinylbenzenes of the formula (I)

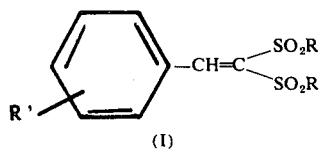

wherein R is alkyl of 1 to 12 carbon atoms or cycloaliphatic of 5 or 6 carbon atoms and R' is lower alkyl, lower alkoxy, or hydrogen as ultraviolet light absorbers or light stabilizers for polymers.

It is well known that sunlight and other sources of ultraviolet radiation causes degradation of polymers as evidenced by embrittlement or yellowing of plastic articles made therefrom. It is also well known that this degradation can be inhibited by use of ultraviolet light absorbers incorporated in or on such articles. Continuing efforts are being made to discover ever-better ultraviolet light absorbers which will be superior to those currently available.

In accordance with the present invention, I have discovered that the above-described compounds are superior ultraviolet light absorbers when used with a variety of polymer substrates. These compounds are very stable to ultraviolet light themselves, ensuring long useful lives for the light stabilizers to protect the polymer substrates. These compounds are also colorless when incorporated in or on polymer articles, a property which is extremely important for articles which are to be colorless or dyed to colors which must not be affected by color in the ultraviolet light absorber. These compounds are also compatible with the polymers in which they are to be used as well as with other additives which may also be present.

Plastic materials which are stabilized against degradation by ultraviolet light using these compounds include polyvinyl chloride, polyvinylidene chloride, copolymers of vinyl chloride and vinylidene chloride, polystyrene, polyesters, cellulose acetate, polyvinyl acetate, polyvinyl fluoride, polymethyl methacrylate, and polycarbonates. These compounds may be incorporated in or on such plastic materials by any of the various standard procedures known in the art for such purpose, such as by dry blending the additive with the polymer in powder or granular form followed by molding or extruding, by milling, by immersing the polymer as film, sheet, fibers, etc. in a solution of the additive in an appropriate solvent (as in a dye process), etc.

The plastic material should contain an effective stabilizing amount of the bis(alkylsulfonyl)vinylbenzene, which amount will depend on the nature of the plastic and the amount of exposure to ultraviolet light to which the plastic will be subjected. Generally, an amount between about 0.01% and 5% by weight of plastic will be found satisfactory and between about 0.1% and 3% will be preferred.

The bis(alkylsulfonyl)vinylbenzene may be used in the plastic alone or in combination with other additives, such as fillers, antioxidants, flame retardants, heat stabilizers, pigments, dyes, lubricants, etc. As taught in Di Giaimo U.S. Pat. No. 3,496,134, alkylenebis-amides, such as methylenebis(acrylamide) augment the stabilizing effect in polyvinyl chloride of many ultraviolet light absorbers. Similarly, such compounds also augment the stabilizing effect of these bis(alkylsulfonyl)vinylbenzenes.

These compounds can be prepared in several ways, depending upon the particular compound to be prepared and the availability of starting materials. In one procedure, the alkyl-or cycloalkyl-mercaptan can be condensed with formaldehyde to give a methylenebis-(alkyl- or cycloalkyl-sulfide) (II) which, in turn, is oxidized to the corresponding sulfone (III) which, in turn, is then condensed with a benzaldehyde to yield the desired bis(alkylsulfonyl)vinylbenzene (I) as illustrated by the following reaction sequence:

$$R-SH + HCHO \longrightarrow R-S-CH_2-S-R \quad (II)$$

$$R-S-CH_2-S-R \xrightarrow{H_2O_2} R-SO_2 - CH_2-SO_2-R \quad (III)$$

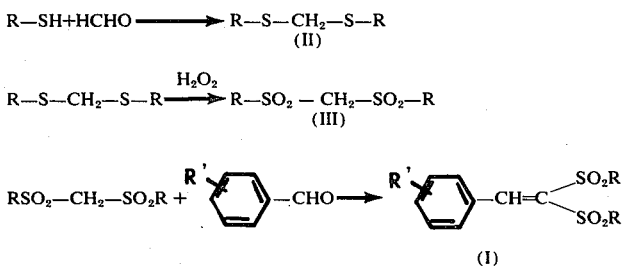

In another procedure, a phenylacetyl chloride is reacted with an alkyl- or cycloalkyl-mercaptan in the presence of zinc chloride to give the intermediate (IV), which loses a molecule of thiol in the presence of a trace of mineral acid to give the intermediate (V), which is then oxidized to the desired bis(alkylsulfonyl)-vinylbenzene (I) as illustrated by the following reaction sequence:

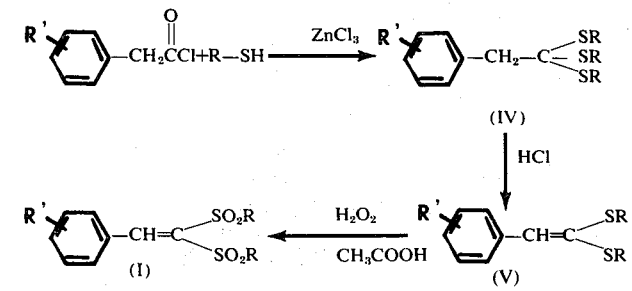

Illustrative of the bis(alkylsulfonyl)vinylbenzenes (I) useful as ultraviolet light absorbers in accordance with the practice of this invention are those wherein R' is a lower alkyl, such as methyl, ethyl, propyl, etc., a lower alkoxy, such as methoxy, ethoxy, propoxy, butoxy, etc., or hydrogen and wherein each R is an alkyl of 1 to 12 carbon atoms, such as ethyl, propyl, butyl, octyl, dodecyl, etc., or a cycloalkyl of 5 or 6 carbon atoms, such as cyclopentyl or cyclohexyl. Such compounds include, but are not limited to 2,2-bis(butylsulfonyl)vinylbenzene; p-[2,2-bis(butylsulfonyl)vinyl]toluene; p-[2,2-bis(butylsulfonyl)vinyl]anisole; 2,2-bis(octylsulfonyl)-vinylbenzene; p-[2,2-bis(octylsulfonyl)vinyl]toluene; p-[2,2-bis(octylsulfonyl)vinyl]anisole; 2,2-bis(dodecylsulfonyl)vinylbenzene; p-[2,2-bis(dodecylsulfonyl)vinyl]toluene; p-[2,2-bis(dodecylsulfonyl)vinyl]anisole; 2,2-bis(cyclohexylsulfonyl)vinylbenzene; p-[2,2-bis(cyclohexylsulfonyl)vinyl]toluene; p-[2,2-bis(cyclohexylsulfonyl)vinyl]anisole; 2,2-bis(cyclopentylsulfonyl)vinylbenzene; p-[2,2-bis(cyclopentylsulfonyl)vinyl]toluene; p-[2,2-bis(cyclopentylsulfonyl)vinyl]anisole, and the like.

This invention is further illustrated by the following examples of a few preferred embodiments thereof.

EXAMPLE 1

20 grams (0.1 mole) of bis(ethylsulfonyl)methane, prepared by the procedure described in Cronyn "Sulfones. I. Methods for the Preparation of Certain Alkanes, Alkenes, Acids and Lactones with Bis-(ethylsulfonyl)-methane" in J. Am. Chem. Soc., vol. 74 page 1225 (see p. 1228), published 1952, was reacted with 0.1 mole of p-methoxybenzaldehyde in 75 ml. of benzene containing 2 ml. of piperidine. The solution was refluxed for 20 hours and then cooled, yielding a white crystalline product, melting point 120°C. Recrystallization from ethyl acetate yielded 9 grams of p-[2,2-bis(ethylsulfonyl)vinyl]anisole, melting point 125°C. having the structural formula

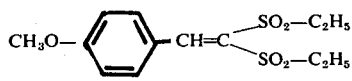

Analysis: Calculated: C, 49.0; H, 5.67; S, 20.02.
Found: C, 48.83; H, 5.49; S, 19.72.

EXAMPLE 2

Using the procedures described in Rinzema et al. "Orthothioesters and 1,1-Bis-(ethylthio)-1-alkenes (Thioacetals of Ketenes)" in Recueil, vol. 78 page 354, published 1959 for the preparation of compounds having the general formula R—CH=C(SC$_2$H$_5$)$_2$, corresponding to intermediate (V), supra, p-[2,2-bis(ethylsulfonyl)vinyl]anisole was prepared as follows.

To a flask containing 250 grams (1.85 moles) of anhydrous powdered zinc chloride was added 146 grams (2.36 moles) of ethyl mercaptan over a period of 30 minutes during which time the temperature was held at 15°–20°C. Following a 30 minute period of stirring, 103 grams (0.56 mole) of p-methoxyphenylacetyl chloride was added dropwise and the reaction mixture was stirred for 2 hours at 50°–55°C. after which it was poured into a stirred dilute 4N aqueous solution of sodium hydroxide at 10°C. The orthothioester of p-methoxyphenylacetic acid (corresponding to intermediate IV, supra) was extracted with toluene. Water was azeotropically distilled and HCl gas was passed through the toluene solution. The reaction mixture was then heated to 120°C. under water-pump vacuum to give 100 grams of crude p-methoxyphenyl ketene diethylthioacetal (corresponding to intermediate V, supra). This was dissolved in 250 ml. of glacial acetic acid to form a solution to which was added 250 grams (2.2 moles) of 30% hydrogen peroxide. The temperature was maintained at 35°–50°C. for 8 hours, after which 1 liter of cold water was added. Recrystallization of the precipitated product, p-[2,2-bis (ethylsulfonyl)vinyl]anisole, from methanol gave 44.5 grams of product, melting point 121°–123°C.

EXAMPLE 3

When Example 1 was repeated except for the substitution of o-methoxybenzaldehyde instead of p-methoxybenzaldehyde, the product o-[2,2-bis(ethylsulfonyl)vinyl]anisole, melting point 140°–142°C. was obtained. This product has the structural formula

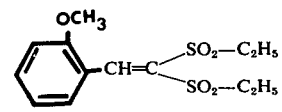

EXAMPLE 4

When Example 1 was repeated except for the substitution of benzaldehyde instead of p-methoxybenzaldehyde, the product 2,2-bis(ethylsulfonyl)vinylbenzene, melting point 93°–94°C. was obtained. This product, described in Leonard "Reaction Products Formed by the Pyrolysis of Substituted Dibenzyl Sulfones" in J. Org. Chem. vol. 30 page 3258 (see page 3260) published 1965, has the structural formula

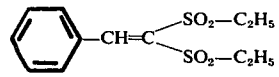

EXAMPLE 5

When Example 1 was repeated except for the substitution of p-methylbenzaldehyde instead of p-methoxybenzaldehyde, the product p-[2,2-bis(ethylsulfonyl)vinyl]toluene, melting point 107°C. was obtained. This product, described in Leonard loc. cit., has the structural formula

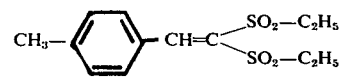

EXAMPLE 6

Plaques 2 × 2.5 × 0.05 inches were prepared from rigid polyvinyl chloride (Geon 103-EP) containing Thermolite 31 [a commercially available di-n-butyl tin bis(isooctyl mercapto acetate)] heat stabilizer and 0.5% stearic acid lubricant, with or without light stabilizers as indicated in Table I, by milling and compression molding.

To determine the effectiveness of the light stabilizer additives, the samples were exposed in a FS-BL (Fluorescent Sunlamp-Blacklight exposure unit) and outdoors in direct sunlight. The Yellow Index (YI) determinations were made with the use of a "Colormaster" differential colorimeter. The FS-BL results are reported as the number of hours to reach a change of 15 Yellow Index units. The sunlight results are reported as the Yellow Index after the specified months exposure in the specified state.

Table I

| Test No. | Other Additives | Initial YI | FS-BL Hrs. to ΔYI=15 | Florida Exposure YI after Months | |
|---|---|---|---|---|---|
| | | | | 6 | 12 |
| 1 | None (Control) | 4 | 130 | 38 | — |
| 2 | 0.5% A | 4 | 460 | 2 | 6 |
| 3 | None (Control) | 7 | 225 | — | — |
| 4 | 0.5% B | 5 | 370 | — | — |

Additive A was p-[2,2-bis(ethylsulfonyl)vinyl]anisole prepared in Example 1.

Additive B was ethyl p-methoxy-α-(phenylsulfonyl) cinnamate disclosed in Dressler et al. U.S. Pat. No. 3,313,771 in Example II, which was run against a separate control at a different time than additive A.

The data in Table I show that Additive A gave about a 250% increase in time for the plastic to degrade a measured amount whereas the closest known prior art compound, Additive B, only gave about a 65% increase in time to degrade the same amount. Additive A was also found to be very effective in outdoor exposure tests.

EXAMPLE 7

By the procedure of Example 6, the effectiveness as a light stabilizer in polyvinyl chloride of p-[2,2-bis(ethylsulfonyl)vinyl]anisole (Additive A) was compared with a similar compound p-[2,2-bis(phenylsulfonyl)-vinyl]anisole (Additive C).

Table II

| Test No. | Other Additives | FS-BL Hrs. to ΔYI=15 |
|---|---|---|
| 5 | None (Control) | 150 |
| 6 | 0.5% A | 465 |
| 7 | 0.5% C | 280 |

The data in Table II show that the alkylsulfonyl compound (Additive A) gave about a 210% increase in time for the plastic to degrade a measured amount whereas the similar arylsulfonyl compound (Additive C) only gave about an 87% increase in time to degrade the same amount.

EXAMPLE 8

Compositions of 100 parts rigid polyvinyl chloride (Geon 103-EP), 1 part organotin mercaptide (Advastab TM180), 2 parts dibutyltin maleate (Advastab T-340), and 0.5 part stearic acid, with or without additional additives as indicated in Table III, were formed into plaques by milling and compression molding and tested for resistance to degradation by measuring the Yellow Index after exposure to sunlight in Arizona and Florida.

Table III

| Test No. | Other Additives | Initial YI | YI After Exposure | | | | |
|---|---|---|---|---|---|---|---|
| | | | Months in Ariz. | | Months in Florida | | |
| | | | 6 | 18 | 6 | 18 | 24 |
| 8. | None (Control) | 6 | 41 | — | 36 | — | — |
| 9. | 0.5% A | 6 | 6 | 20 | 4 | 8 | 11 |
| 10. | 0.5% A + 0.5% M | 6 | 3 | 8 | 3 | 6 | 8 |

Additive A was p-[2,2-bis(ethylsulfonyl)vinyl]anisole.
Additive M was methylenebis(acrylamide).

The data in Table III shows that (a) Additive A provides significant protection to the plastic against degradation by sunlight and (b) additional presence of methylenebis(acrylamide) greatly augments the stabilization effect.

EXAMPLE 9

Plaques were prepared by milling and compression molding polystyrene (Monsanto HF-77), without or with 0.3% p-[2,2-bis(ethylsulfonyl)vinyl]anisole (Additive A) and then exposed to ultraviolet radiation for the indicated times before measuring the Yellow Index as seen in Table IV.

Table IV

| Test No. | Additive | YI After Exposure to UV | | |
|---|---|---|---|---|
| | | 0 Hrs. | 1500 Hrs. | 2000 Hrs. |
| 11. | None (Control) | 2 | 16 | 25 |
| 12. | 0.3% A | 2 | 6 | 18 |

This data illustrates the effectiveness of the additive for inhibiting degradation of polystyrene by ultraviolet light.

I claim:
1. p-[2,2-bis(ethylsulfonyl)vinyl]anisole.

* * * * *